Feb. 17, 1959 W. H. HOGAN 2,873,833
OVERRUNNING CLUTCH
Filed Nov. 29, 1954

INVENTOR.
WALTER H. HOGAN
BY
ATTORNEY

# United States Patent Office 2,873,833
Patented Feb. 17, 1959

2,873,833

OVERRUNNING CLUTCH

Walter H. Hogan, Olmsted Falls, Ohio, assignor to Cleveland Pneumatic Industries, Inc., Cleveland, Ohio, a corporation of Ohio Application November 29, 1954, Serial No. 471,609

4 Claims. (Cl. 192—41)

This invention relates generally to clutches and more particularly to a new and improved overrunning clutch.

In many instances it is desirable to provide an overrunning clutch having no backlash which is capable of carrying large torque loads. A clutch according to this invention meets these requirements and provides a new and improved structure wherein low cost high production methods of manufacture may be utilized to reduce the manufacturing cost of the clutch to a minimum.

It is an important object of this invention to provide an overrunning clutch mechanism having no backlash which cannot stick or jam.

It is another object of this invention to provide a compact overrunning clutch capable of withstanding large loads.

Further objects and advantages will appear from the following description and drawings, wherein.

Figure 1:
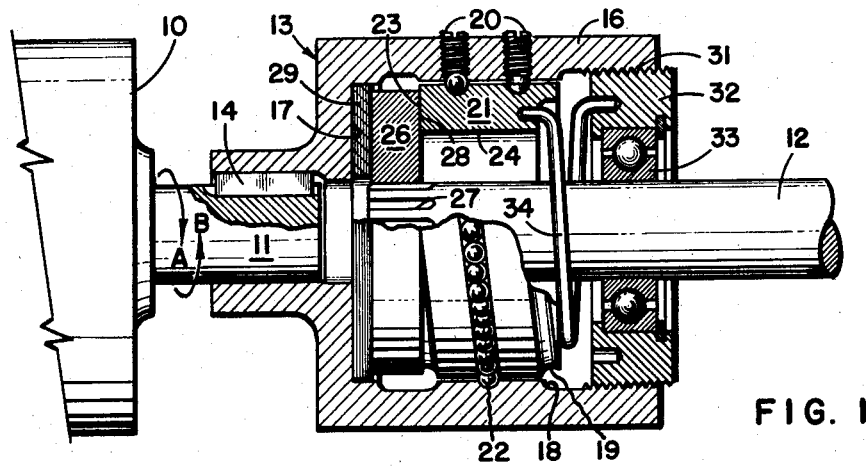
Figure 1 is a side elevation partially in longitudinal section showing an overrunning clutch according to this invention.

For a clear understanding of this invention, reference should be made to the drawings wherein the overrunning clutch is disclosed. Figure 1 shows one form of this invention which is particularly adapted for connecting a drive shaft to a driven shaft. A motor 10 is provided with a drive shaft 11 which is connected to a driven shaft 12 by the overrunning clutch. The clutch includes a drive housing 13 mounted on the drive shaft 11 and fixed against rotation relative thereto by a key 14. The drive housing 13 is formed with an axially extending cylindrical portion 16, having an internal diameter larger than the diameter of the drive shaft 11, terminating at its inner end in a radially extending shoulder 17. The cylindrical portion 16 is formed with an internal helical groove 18 which cooperates with an external helical groove 19 formed in a clutch member 21 to define a helical ball channel filled with balls 22. Stop pins 20 are threaded into the housing 13 and extend into the ball channel to prevent the balls 22 from working out of the channel as the clutch operates. Those skilled in the art will recognize that this ball screw structure provides a very efficient low cost connection where the function is to transmit forces with essentially no motion. The clutch member 21 is also provided with an end face 23 spaced from and opposite to the shoulder 17 and an internal bore 24 adapted to loosely receive the driven shaft 12.

A driven member 26 is mounted on the driven shaft 12 by means of a spline 27 so that it is rotatably fixed and axially movable relative thereto. The driven member 26 also provides a radial wall 28 engageable with the end face 23 of the clutch member 21. Positioned between the shoulder 17 and the driven member 26 is a thrust washer 29 preferably formed of sintered metal impregnated with a lubricant so that it has a very low coefficient of friction.

Mounted on the outer end of the cylindrical portion 16 by threads 31 is a bearing ring 32 which supports the outer race of an antifriction bearing 33, the inner race of which engages and radially supports the driven shaft 12. A torque spring 34 is anchored at one end in the clutch member 21 and at the other end in the bearing ring 32 and is proportioned to apply a rotational force to the clutch member 21 in the direction which causes it to be threaded toward the driven member 26, thus maintaining engagement therebetween.

Figure 2:
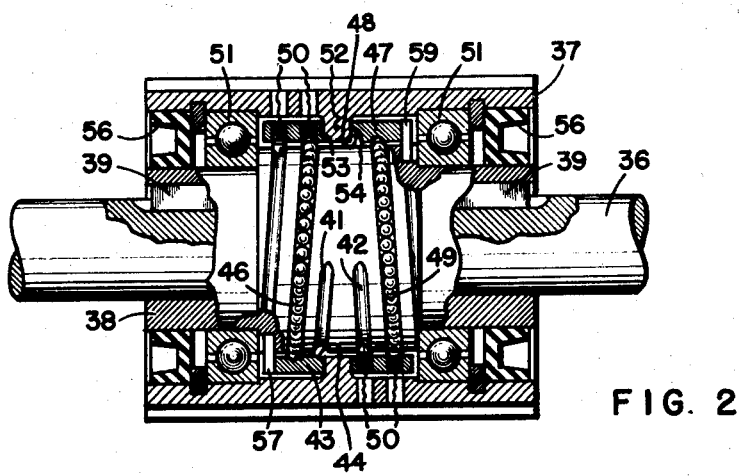
Figure 2 is a side elevation partially in longitudinal section of a modified form of the overrunning clutch according to this invention; and, Figure 3 is a perspective sectional view of the clutch shown in Figure 2, rotated 180° about its axis with parts removed for purposes of clarity.
Figure 3:
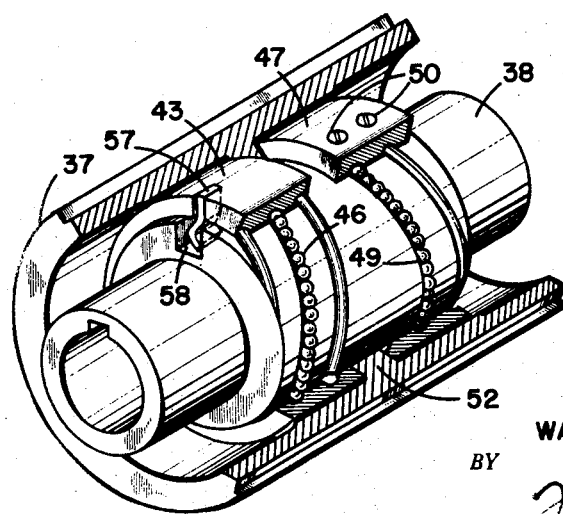

The embodiment shown in Figures 2 and 3 is capable of transmitting substantially twice as much torque as the embodiment shown in Figure 1. In this embodiment a shaft 36 extends through a housing 37 which may be connected to a second shaft or to a stationary frame. Mounted on the shaft 36 is a collar 38 fixed against rotation relative thereto by keys 39. The central portion of the collar 38 is formed with two helical grooves 41 and 42, the leads of which are in opposite directions. A floating clutch member 43 is positioned around the groove 41 and is provided with an internal helical groove 44 which cooperates with the groove 41 to define a helical ball channel filled with balls 46. A second floating clutch member 47 is positioned around the groove 42 and is provided with an internal helical groove 48 which cooperates with the groove 42 to define a second helical ball channel filled with balls 49. Stop pins 50 are threaded into each of the clutch mmebers 43 and 47 and project into the ball channel to prevent the escape of the balls 46 and 49.

Bearings 51 are positioned between the housing 37 and the collar 38 and provide radial support between these two elements so that they may be rotated relative to each other about the same axis. The housing 37 is also provided with an inwardly extending flange 52 which provides spaced radial walls 53 and 54 engageable by the ends of the floating clutch members 43 and 47 respectively. Dirt seals 56 are positioned in either end of the clutch to prevent dirt from penetrating into the mechanism.

A spring 57 is positioned in a notch formed in the floating clutch member 43 and extends radially inward into a notch 58 formed in the collar 38 and applies a resilient bias tending to rotate the floating clutch member 43 relative to the collar 38 in a direction which causes the clutch member to be threaded axially toward the wall 53. A similar spring 59 is mounted in the floating clutch member 47 and is arranged to urge its clutch member in the same direction as the spring 57. Because the helical groove 42 is in a direction opposite to the groove 41, the bias of the spring 57 causes the floating clutch member 47 to be threaded toward the wall 54.

Since the mode of operation in both of the embodiments is similar, a clear understanding of the operation will be achieved by first discussing the clutch shown in Figure 1. The spring 34 applies a resilient rotational force to the clutch member 21 which is translated by the balls 22 into an axial force in the direction of the driven member 26. Since the spring force is applied as torque it must be translated into an axial force by the balls 22 which urges the clutch member 21 to the left as shown in Figure 1. This provides an axial preload to the balls which takes up the clearance between the balls and the grooves and eliminates any play or backlash which might occur due to such clearances.

If the housing 13 is rotated by the motor 10 in the direction indicated by the arrow B, the clutch member 21 will tend to rotate relative to the driven member 26 and the frictional drag between the end face 23 and the radial wall 28 will supply torque on the clutch member 21 which resists the torque supplied by the spring 34. This torque applied by the frictional engagement tends to cause relative movement between the clutch member 21 and the housing 13 and tends to thread the clutch member axially relative to the housing 13 to the right against the torque supplied by the spring 34. This of course results in a decrease in the frictional engagement between the end face 23 and the wall 28 which reduces the drag. Those skilled in the art will recognize the clutch member cannot move out of engagement with the driven member since it is this engagement which supplies the power tending to move the clutch member. Therefore, when equilibrium is reached, the drag will be equal to the torque applied by the spring 34 so the clutch member 21 will rotate freely with essentially no torque applied to the driven member 26. For most desirable operation, the torque supplied by the spring is arranged to be only the torque necessary to maintain the engagement between the clutch member and the driven member regardless of the position of clutch operation. If, however, the drive shaft is rotated in the direction shown by the arrow A, the rotational drag between the end face 23 and the wall 28 will be in the opposite direction. This will supply a torque resisting rotation of the clutch member 21 with the housing 13, which augments the torque supplied by the spring 34 and creates axial force through the thread connection which urges the clutch member 21 to the left as shown in Figure 1. This increases the frictional engagement between the clutch member 21 and the driven member 26 which in turn increases the drag of the frictional engagement. Of course, the axial force between the clutch member 21 and the driven member 26 is transmitted to the thrust washer 29 and in turn back to the housing 13. If the friction engagement is in a radial plane, locking between the clutch member 21 and the driven member 26 can only be achieved when the coefficient of friction between the end face 23 and the wall 28 times the effective radius of the engagement is at least as great as the tangent of the lead angle of the helical grooves 18 and 19 times the effective radius of the ball screw connection divided by the efficiency of the connection. If these conditions are met it will be impossible for the clutch member 21 to rotate relative to the driven member 26 since the frictional drag is always greater than the torque applied. Also there can be no relative rotational motion between the clutch member 21 and the housing 13 so a complete connection between the drive shaft 11 and the driven shaft 12 is provided. In the embodiments shown, the clutch member 21 and the driven member 26 are both formed of metal. It is often possible to use such a metal to metal engagement when an antifriction screw mechanism with a relatively small lead angle is used. In some applications, however, it may be necessary to obtain higher coefficients of friction than can be obtained from a metal to metal engagement and in these cases a friction lining or a driven member formed of material having high friction characteristics may be used. Again in such cases a cone clutch may be used to increase the effective coefficient of friction.

There is no backlash in this clutch since the clutch member 21 remains in engagement with the driven member 26 during all conditions of operation and, therefore, there is essentially no relative motion between the elements. The only relative motion occurring between engagement and disengagement of the clutch is the amount of axial motion necessary to compensate for the deflection of the elements. This is necessarily small because the elements are made of rigid material such as metal. Since there is essentially no motion between the clutch member 21 and the housing 13 and the balls do not roll along the grooves any appreciable distance, it is possible to use a simple ball screw structure with stop pins 20. Also since the balls 22 cannot jam in the grooves, there can be no sticking or jamming of the clutch regardless of the load applied. It should be noted that the spline connection between the driven member 26 and the driven shaft 12 permits axial motion between these members so the axial position of the shaft 12 relative to the shaft 11 is not critical. Also wear cannot affect the operation of the device since the clutch member 21 is always urged into engagement with the driven member 26 by the spring 34.

The embodiment shown in Figures 2 and 3 functions in a manner similar to the embodiment shown in Figure 1; however, two floating clutch members 43 and 47 are provided which engage opposed faces of the inwardly projecting flange 52. When the shaft tends to rotate in one direction relative to the housing both of the floating clutch members tend to rotate relative to the collar 38 and reduce the frictional engagement with the flange 52. Rotation in this direction will result in essentially no drag in the clutch mechanism. If, however, the shaft tends to rotate in the opposite direction, both of the floating clutch members 43 and 47 tend to rotate relative to the collar 38 and apply a large axial force against the flange 52 by virtue of the ball screw type connection between the collar in the clutch members. Each clutch member will supply an axial force toward the engagement which is equal to the axial force created by the other clutch member so that no axial reaction results between the housing 37 and the shaft 36. Since this embodiment provides two clutch members and two ball screw connections, it can transmit substantially twice as much torque as the embodiment of Figure 1.

Although preferred embodiments of this invention are illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforementioned detailed description are determinative of the scope of the invention.

I claim:

1. A clutch comprising a first element and a second element rotatable relative to said first element about an axis, clutch member axially aligned with a portion of said first element providing a face engageable therewith, said clutch member and the said second element each being formed with cooperating helical grooves having the same lead angle, antifriction members in said grooves connecting said clutch member and said second element whereby relative rotation between said clutch member and said second element produces axial motion therebetween, and resilient torque means resiliently urging said clutch member in a rotational direction relative to said second element and through the connection of said antifriction members maintaining said face in engagement with said first element, the effective radius of the engagement between said face and said first element times the coefficient of friction of the engagement being at least equal to the effective radius of said antifriction members times the tangent of said lead angle divided by the efficiency of said antifriction members.

2. A clutch comprising a first element and a second element rotatable relative to said first element about an axis, a clutch member axially aligned with a portion of said first element providing a face engageable therewith, said clutch member and said second element each being formed with cooperating helical grooves having the same lead angle, antifriction members in said grooves connecting said clutch member and said second element whereby relative rotation between said clutch member and said second element produces axial motion therebetween, thrust means limiting axial motion between said elements and resilient torque means resiliently urging said clutch member in a rotational direction relative to said second element and through the connection of said anti-friction members maintaining said face in engagement with said first element, the effective radius of the engagement between said face and said first element times the coefficient of friction of the engagement being at least equal to the effective radius of said antifriction members times the tangent of said lead angle divided by the efficiency of said antifriction members.

3. A clutch comprising a first element and a second element rotatable relative to said first element about an axis, said first element being formed with axially spaced radially extending faces, clutch members axially aligned with said faces each providing a surface engageable with one of said faces, said clutch members and said second element each being formed with cooperating helical grooves having the same lead angle, the direction of lead of the groove in one clutch member being opposite to the direction of lead of the groove in the other clutch member, antifriction members in said grooves connecting said clutch members and said second element whereby relative rotation between said clutch members and said second element in the same direction produces axial motion between said clutch members and said second element in opposite directions, and resilient torque means resiliently urging each of said clutch members in a rotational direction relative to said second element which through the connection of said anti-friction members maintains said surfaces in engagement with said faces, the effective radius of the engagement of said surfaces times the coefficient of friction of the engagement being at least equal to the effective radius of said antifriction members times the tangent of said lead angle divided by the efficiency of said antifriction members.

4. A clutch comprising a housing and a shaft assembly rotatable relative to said housing about an axis, said housing being formed with axially spaced radially extending faces, clutch members axially aligned with said faces each providing a surface engageable with one of said faces, said clutch members and said shaft assembly being formed with cooperating helical grooves having the same lead angle, the direction of lead of the groove in one clutch member being opposite to the direction of lead of the groove in the other clutch member, antifriction members in said grooves connecting said clutch members and said shaft assembly whereby relative rotation between said clutch members and said shaft assembly in the same direction produces axial motion therebetween in opposite directions, and resilient torque means resiliently urging each of said clutch members in a rotational direction relative to said second element which through the connection of said anti-friction members maintains said surfaces in engagement with said faces, the effective radius of the engagement of said surface times the coefficient of friction of the engagement being at least equal to the effective radius of said antifriction members times the tangent of said lead angle divided by the efficiency of said antifriction members.

References Cited in the file of this patent

UNITED STATES PATENTS

| | | |
|---|---|---|
| 150,313 | Findlay et al. | Apr. 28, 1874 |
| 936,190 | Tuckfield | Oct. 5, 1909 |
| 1,495,366 | Williamson et al. | May 27, 1924 |
| 2,151,724 | Wengel et al. | Mar. 28, 1939 |
| 2,349,925 | Andreau | May 30, 1944 |
| 2,480,212 | Baines | Aug. 30, 1949 |
| 2,731,211 | Moquist | Jan. 17, 1956 |